United States Patent
Hoeting et al.

(10) Patent No.: US 7,090,220 B2
(45) Date of Patent: Aug. 15, 2006

(54) CARTRIDGE-TYPE BEARING SEAL FOR MACHINE TOOL SPINDLE

(75) Inventors: Stephen C. Hoeting, Maineville, OH (US); Bobby L. Hodge, Hebron, KY (US)

(73) Assignee: Setco Sales Co., Cincinnati, OH (US)

( * ) Notice: Subject to any disclaimer, the term of this patent is extended or adjusted under 35 U.S.C. 154(b) by 0 days.

(21) Appl. No.: 10/654,811

(22) Filed: Sep. 4, 2003

(65) Prior Publication Data

US 2005/0051969 A1 Mar. 10, 2005

(51) Int. Cl.
*F16J 15/40* (2006.01)
*F16J 15/447* (2006.01)

(52) U.S. Cl. .................. 277/347; 277/411; 277/421; 277/431

(58) Field of Classification Search ............... 277/411, 277/412, 421, 371, 408, 431, 347; 384/477–479
See application file for complete search history.

(56) References Cited

U.S. PATENT DOCUMENTS

| | | | | |
|---|---|---|---|---|
| 4,415,166 A | * | 11/1983 | Beia | 277/551 |
| 5,522,601 A | * | 6/1996 | Murphy | 277/421 |
| 5,727,095 A | * | 3/1998 | Hoeting | 384/478 |
| 5,980,115 A | | 11/1999 | Hoeting | |
| 6,062,568 A | * | 5/2000 | Orlowski et al. | 277/348 |
| 6,217,219 B1 | | 4/2001 | Hoeting | |
| 6,367,807 B1 | * | 4/2002 | Rockwood | 277/412 |
| 6,471,215 B1 | * | 10/2002 | Drago et al. | 277/412 |
| 6,485,022 B1 | * | 11/2002 | Fedorovich | 277/303 |

FOREIGN PATENT DOCUMENTS

EP 0860637 B1 12/2001

OTHER PUBLICATIONS

Setco, *SETCO Airshield*, SETCO Sales Company, Publication S-0006-1, 2003.
Setco, *SETCO "Universal" AirShield Spindle Seal System*, SETCO Sales Company, Publication S-0008, 2002.
*Effective Sealing of High Speed Rolling Bearings*, Dr. Werner Haas, University of Stuttgart, publication date unknown.

* cited by examiner

*Primary Examiner*—Vishal Patel
(74) *Attorney, Agent, or Firm*—Wood, Herron & Evans, LLP

(57) ABSTRACT

A cartridge type bearing seal facilitates the prevention of contaminant ingress between a spindle rotor and a spindle housing, particularly in situations where a circumferentially uniform fluid pressure is generated within the annular volume of the spindle housing. The cartridge includes ringlike rotor and stator sections which can be compressed axially to snap fit together, in a manner which enables relative rotation about a common axis. When interconnected, the sections define an inside surface and an outside surface, and a fluid flow path which extends radially outwardly therebetween, and which traverses a collar and tangs construction which enables the snap fit connection. The tangs are arcuate in shape and spaced equidistantly around the axis. The total arcuate space occupied by the tangs is relatively small, compared to the total arcuate space residing between the tangs, and bounded by the two sections adjacent the collar. This structure allows the pressurized purge fluid to flow outwardly from the cartridge during use, to prevent contaminant ingress during operation of the spindle. This construction may be readily adapted to accommodate a spindle of virtually any size or shape, at relatively low cost, and is particularly suitable for retrofitting an existing spindle which has experienced a failed seal.

10 Claims, 4 Drawing Sheets

CARTRIDGE-TYPE BEARING SEAL FOR MACHINE TOOL SPINDLE

FIELD OF THE INVENTION

This invention relates to a bearing seal for a machine tool spindle, and more particularly to a cartridge which houses the bearing seal.

BACKGROUND OF THE INVENTION

The assignee of the present invention, Setco Sales Company, owns U.S. Pat. Nos. 5,727,095, 5,980,115 and 6,217,219 B1, all of which are entitled "Bearing Seal With Uniform Fluid Purge," and directed to a unique bearing seal which has proved tremendously successful in increasing the reliability of spindles. Setco sells this patented bearing seal under the trademark AIRSHIELD®. These Setco patents are incorporated herein by reference, in their entireties.

According to one aspect of the prior invention, the bearing seal includes an annular cap located at a first end of a bearing housing, where a shaft exits therefrom. The cap has an internal surface which defines an annular internal volume, and a passage formed therethrough which tangentially intersects the annular volume. This structure allows pressurized purge fluid to be supplied to the annular volume via the passage, to create a circumferentially uniform fluid pressure within the annular volume. This circumferentially uniform pressure prevents ingress of contaminant materials within the bearing.

This prior invention has significantly increased spindle reliability, by reducing downtime caused by failed bearing seals. Such downtime can have critical adverse effects on overall spindle efficiency and throughput.

These prior patents disclose four specific embodiments for achieving the critical benefits of this prior invention. Moreover, these prior patents expressly suggest that the benefits of that prior invention can be obtained in retrofit situations, where an in-place spindle with a failed bearing seal requires the retrofitting of a new bearing seal. These prior patents suggested some general details of how such a retrofitted bearing seal could be achieved. However, those prior patents did not disclose or suggest a specific structure for achieving the benefits of the prior invention with a wide variety of spindles of various size and shape.

It is an object of the present invention to more easily and effectively retrofit bearing seals on in-place spindles.

It is another object of the present invention to more readily accommodate existing spindles of various size and shape with a new and improved bearing seal.

It is still another object of the invention to improve, in a relatively simple and cost-effective manner, the sealing efffectiveness of existing spindles.

SUMMARY OF THE INVENTION

The present invention achieves these above-stated objects by equipping the end of a spindle housing with an annular cartridge having releasably connectable stator and rotor sections which define a flow path therebetween, the flow path extending from a radial internal surface to a radial external surface. The flow path traverses the internal structural components which enable these two sections to be releasably connectable, and also relatively rotatable about the axis of the spindle.

According to one aspect of the invention, this structure includes a ring-shaped stator section with a circumferential, radially inwardly extending collar and a ring-shaped rotor section with at least three arcuately spaced tangs sized in a complementary manner to engage the collar and hold the sections together, in a manner which permits relative rotation about a common axis. The collar of the stator section is sufficiently deflectable, in a radially outward direction, that the sections can be pushed together and retained by applying force in the desired axial direction. Thus, the collar and the tangs provide a snap fit.

Also, the collar lip and the tangs are sized and shaped such that pressurized purge fluid may pass therebetween, through the annular space not occupied by the tangs, and radially outwardly from the cartridge. Thus, when pressurized purge fluid is supplied to the passage at the radial inside surface, the fluid moves radially outwardly, preferably past a circumferential seal lip, then past the collar/tang structure and then out of the cartridge. Generally, because the rotor section and the tangs are rotating relative to the stator section and the collar, the fluid flow from the cartridge remains circumferentially uniform in volume and in pressure. This prevents the ingress of contaminants into the spindle housing.

With this structure, a relatively simple cartridge assembly can be sized and manufactured for a wide variety of spindle sizes and shapes. In combination with a cap assembly for supplying tangentially directed purge fluid to the seal housing, this cartridge can be retrofitted to virtually any in-place spindle. Thus, this invention facilitates the retrofitting of bearing seals on existing spindles, and does so in a cost-effective manner, while at the same time producing a better seal.

This inventive cartridge not only facilitates the replacement of a worn out bearing seal, it results in a bearing seal which in many cases is better and more effective than the previous one supplied by the spindle manufacturer. In other words, this inventive cartridge will result in a bearing seal which is a significant improvement over the original bearing seal. This invention will result in longer lasting life for the spindle itself, and reduced downtime for the spindle, thereby enhancing the overall productive life of the spindle.

In addition, this inventive cartridge represents a next generation improvement for bearing seals. In practical terms, this inventive cartridge allows Setco's prior invention, the AIR SHIELD principle, to be applied to a greater number and wider variety of spindles.

According to a preferred embodiment of the invention, a cartridge bearing seal of the present invention is annular in shape and includes two releasably connected ring-shaped stator and rotor sections. The stator section includes a circumferentially extending collar which flexes in the radial direction when the rotor section is pressed axially against it, such that a plurality of axially spaced tangs of the rotor section force the collar radially outwardly and then allow the collar to move back into place, to hold the two sections together. While the intent of the snap fit is to retain the two seal sections the collar has sufficient flexibility that the sections can be disconnected if needed by pulling them apart in an axial direction.

When connected to form the cartridge, the combined stator and rotor sections define a radial inside surface and a radial external surface, and a fluid flow path therebetween which generally extends from the inside circumferential surface to the outside surface. The annular fluid path traverses an annular lip, and thereafter, an annular space which resides between the collar of the stator section and the body of the rotor section, and the tangs of the rotor section, and then traverses radially outwardly from the cartridge. Pressurized purge fluid entering the flow path at the inside surface will move past the annular lip in a radially outward direction, then outwardly past the collar of the stator section, and then outwardly from the cartridge in a radial direction. This pressurized fluid flow prevents contaminate ingress into the spindle housing, thereby protecting the bearings of the spindle. Moreover, this structure inhibits contaminant ingress in a manner which does not hinder the effectiveness or operability of the spindle, and specifically the rotatability of the rotor relative to the stator.

In the context of this disclosure, those skilled in the art will appreciate that the parts described by the term "rotor," as used in this specification, could also be referred to as a "spindle arbor." Also, the parts described by the term "stator" or the phrase "bearing housing," as used in this specification, could also be referred to as a "seal housing."

These and other features will be more readily understood in view of the following detailed drawings.

DETAILED DESCRIPTION OF THE PREFERRED EMBODIMENTS

Figure 1:
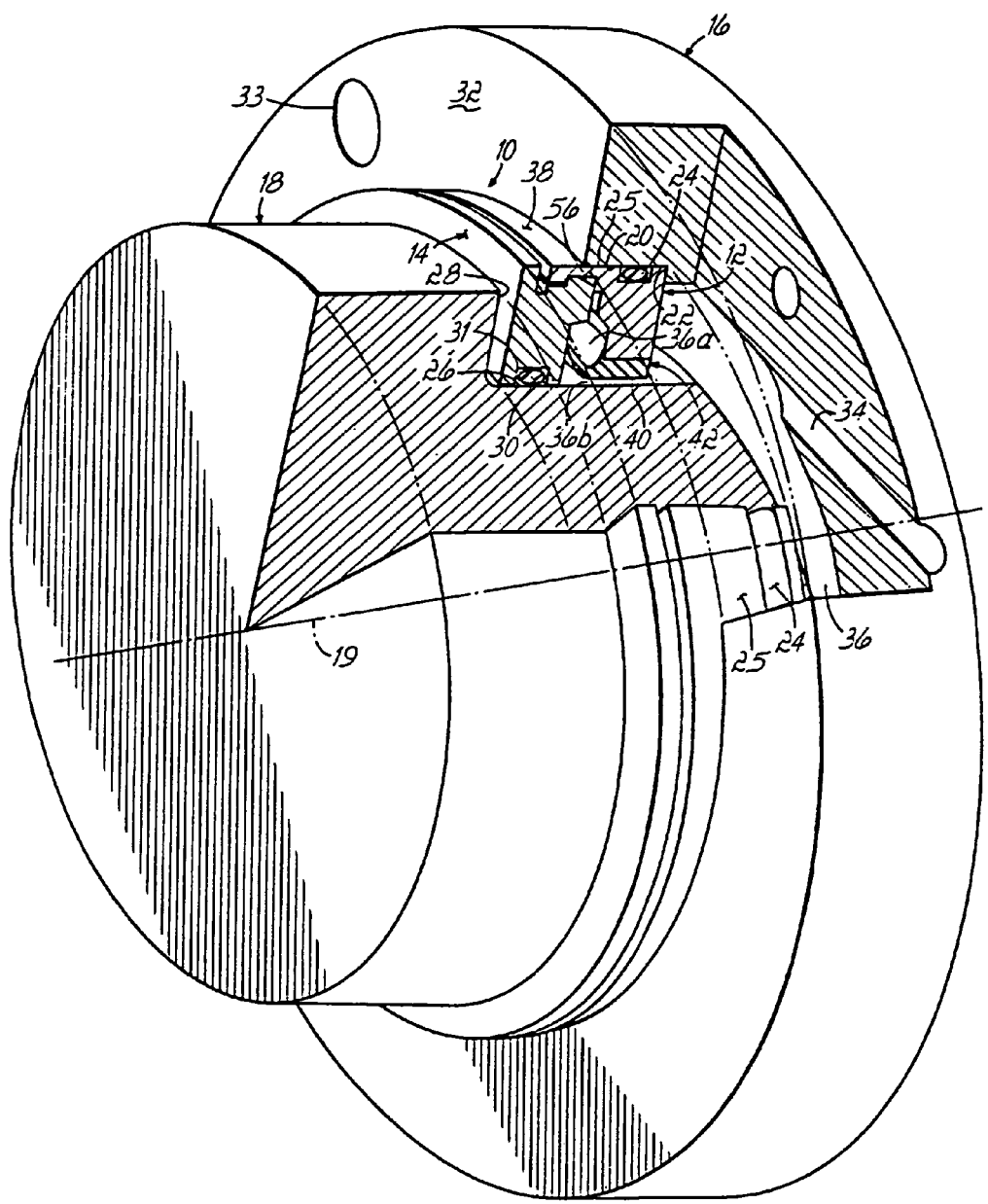
FIG. 1 is a perspective view, in partial cutaway, of a cartridge bearing seal in accordance with a first preferred embodiment of the invention, with the cartridge bearing seal mounted in place on the stator and the rotor of a spindle.

FIG. 1 shows a cartridge bearing seal constructed in accordance with a first preferred embodiment of the invention. This patent expressly incorporates by reference herein the disclosures of previously mentioned U.S. Pat. Nos. 5,727,095; 5,980,155; and 6,217,219 B1, all entitled "Bearing Seal With Uniform Fluid Purge." As noted above, the cartridge bearing seal of this invention makes the inventive bearing seal of those prior patents more readily available to a wider variety of spindle structures. And this inventive cartridge bearing seal is particularly suitable for retrofitting in-place spindles.

FIG. 1 shows that the bearing seal of this invention comprises an annular cartridge 10 with interconnected first and second sections 12 and 14, respectively. As shown in FIG. 1, the first section 12 is a stator section, and it is fixedly mounted to a stator 16, while second section 14 is a rotor section which is fixedly mounted to a rotor 18. The rotor 18 rotates relative to the stator 16, about an axis 19, when driven by a drive motor (not shown). The stator section 12 is piloted into a circular recess formed within stator 16, and defined by an axially oriented surface 20 and a radially oriented surface 22, relative to axis 19. An O-ring 24 resides within a recess 25 formed within an exterior surface of the stator section 12. These surfaces 22 and 24 form part of the stator 16 located at one end of a stator housing. When the first section 12 is mounted in place on the stator 16, in this press fit condition, the first section 12 remains fixed relative to the axis 19. That is, the first section 12 effectively becomes part of the stator 16.

In contrast, the second section 14 mounts to the rotor 18 in such as way that it effectively becomes a part of the rotor 18, because the rotor 18 and the rotor section 14 rotate together about axis 19 during operation. The rotor section 14 mounts to the rotor 18, via a press fit, along axially directed surface 26 and radially directed surface 28 formed along the outer surface of the rotor surface 18. An O-ring 30 resides within a recess 31 formed along the radial inner edge of the rotor section 14.

As shown in FIG. 1, the stator section 12 is rigidly mounted to the stator 16, while the rotor section 14 is rigidly mounted to the rotor 18. At the same time, the stator section 12 and the rotor section 14 are releasably connected to define an annular cartridge 10, in a manner which permits relative rotation of rotor section 14 relative to the stator section 12 about axis 19. The first section 12 and second sections 14 are preferably constructed in a manner which allows a snap fit interconnection of these two components, by applying axially directed force to both of the sections in order to snap them together, in a manner to be described in more detail later.

FIG. 1 also shows an annular end cap 32 which forms part of the structure of the stator 16. Preferably, the end cap 32 is removably connectable to the rest of the stator 16, at the end of a bearing housing, via bolts (not shown) extended through bolt holes 33. The end cap 32 includes an internal passageway 34. This passageway 34 is oriented tangential to an internal annular volume 36 which circumferentially surrounds the rotor 18. This annular volume 36 includes a relatively large volume 36a located adjacent the end cap 32, and a relatively thin annular volume 36b located closer to the rotor section 14. As shown in the figures via volumes 36, 36a and 36b, that a flow path is annular in shape along its axial length with no non-annular discontinuities along its axial length.

The cartridge 10 generally has an outer or exterior surface 38 and an inner or interior surface 40. The interior surface 40 is located adjacent to and forms an outer boundary for the annular volume 36b. Just radially outside of the annular volume 36b, the cartridge 10 includes a seal 42 affixed to the stator section 12, of the type disclosed in the prior patents cited above. The circumferential seal 42 includes a circumferential lip 44 which engages the rotor section 14 when the rotor 18 is not rotating relative to the stator 16. When the rotor 18 is rotating relative to stator 16 about axis 19, and with pressurized purge fluid supplied to the annular volume 36, the lip 44 (FIG. 3) flexes away from the rotor section 14 to allow purge fluid to flow radially outwardly, in a uniform manner, along a path defined by the open space between the stator section 12 and rotor section 14. Reference numeral 47 (FIG. 3) generally designates the axial distance between the stator section 12 and the rotor section 14, when these two sections are snap fit together.

Figure 2:
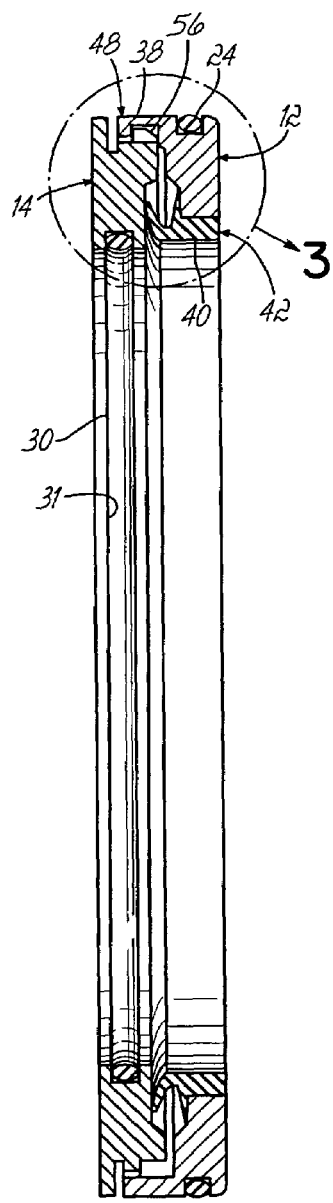
FIG. 2 is a longitudinal cross-sectional view of the cartridge bearing seal shown in FIG. 1.

FIG. 2 shows additional details of the annular cartridge 10 of the present invention. More specifically, FIG. 2 shows a circumferential collar 48 extending around the exterior of the stator section 12. This collar 48 includes an outer axially extending section 50 and a radially inwardly extending section 52. Preferably, the stator section 12 is made of a relatively flexible material, such as 1018 or 1020 steel.

Alternatively, stator section 12 may be made of stainless steel, carbon steel or any other suitable material which is sufficiently durable and sufficiently flexible to achieve the purposes previously described. Preferably, the stator section 14 is made of 4145 hardstock steel, and it is machined to the desired shape via a series of machining steps which may be done on the same machine.

Figure 3:
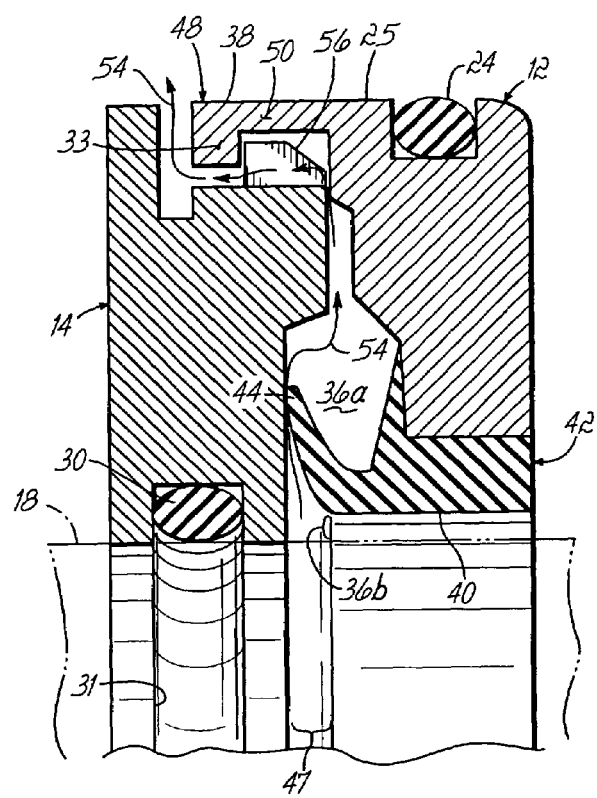
FIG. 3 is an enlarged view of one portion of the cartridge bearing seal shown in FIG. 2.

As shown most clearly in FIG. 3, when snap fit together the stator and rotor sections 12 and 14, respectively, define a fluid flow path which resides therebetween, as shown by directional arrows 54. Essentially, this fluid flow path 54 traverses the annular space residing between the stator section 12 and the rotor section 14, but does so by traversing radially outwardly past the lip 44 and eventually beyond the outer surface 38 of the cartridge 10.

FIG. 3 also shows more details of the structure which enables the snap fit interconnection of the stator section 12 and the rotor section 14. More specifically, FIG. 3 shows a tang 56 which extends radially outwardly from a major portion of the second section 14. According to the one aspect of the invention, the cartridge 10 employs three tangs 56 which are equidistantly spaced about the circumference of the rotor section 14. However, a different number of suitably sized tangs 56 may be used in order to achieve the objects of the present invention. Most importantly, the tangs 56 are shaped to cooperatively interact with the collar 48, and particularly with the radially inwardly oriented section 52 of the collar 48, so as to allow the snap fit connection, and to permit rotation of the rotor section 14 relative to the stator section 12 about axis 19, with no impediment to relative rotational movement of the rotor section 14 about the axis 19.

Figure 4:
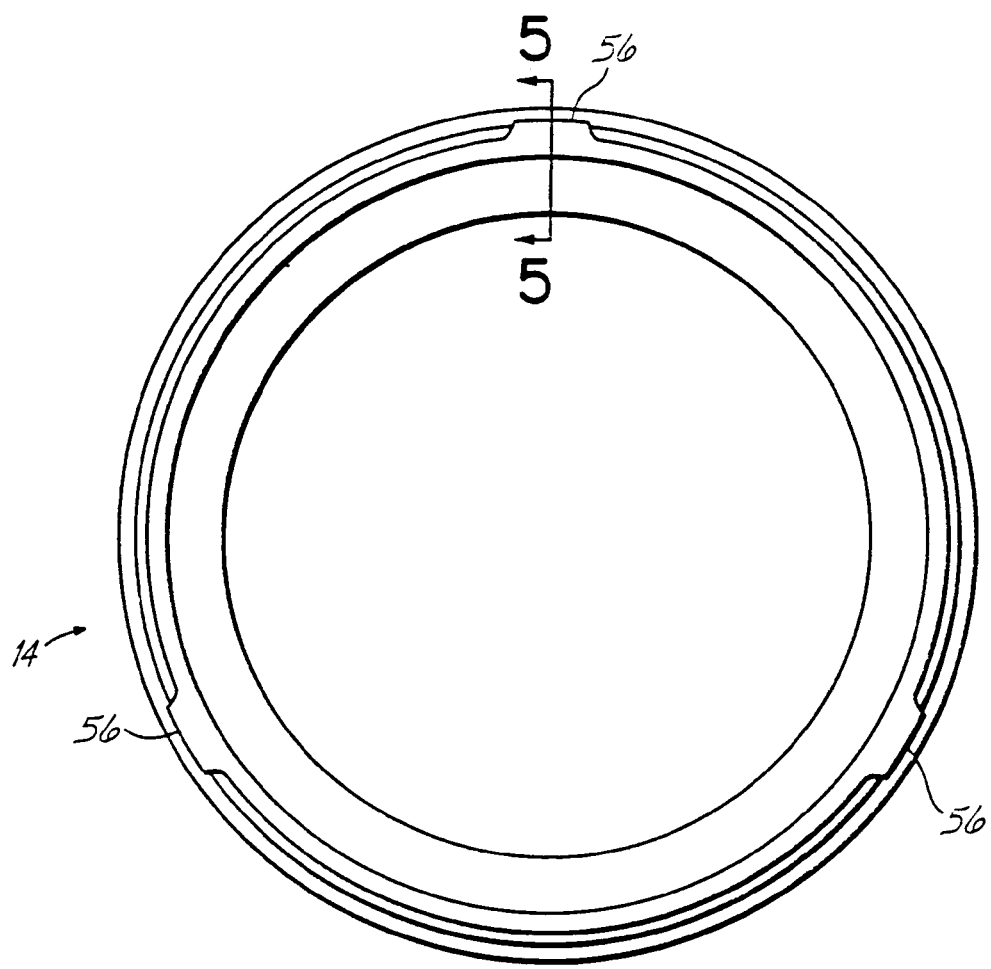
FIG. 4 is a plan view of the stator section of the cartridge bearing seal in accordance with the first preferred embodiment of the invention.

FIG. 4 shows the stator section 14, as viewed in an axial direction. In this view, the tangs 56 are shown in greater detail. According to the first preferred embodiment of the invention, three identically shaped tangs cooperate with the collar 48 of the stator section 12 to enable the snap fit interconnection of the sections 12 and 14 to form the annular cartridge 10. Although the present application discloses the use of different types of steel for fabricating the stator section 12 and the rotor section 14, those skilled in the art will readily understand that various different materials may be used in order to achieve the desired snap fit of these two sections, in a manner which enables the sections 12 and 14 to be connected together by applying axially compressive force, to retain them in an axial direction. Also, the present application shows and describes structure wherein collar 48 flexes radially in order to achieve this snap fit connection, with three tangs 56 sized and shaped in a complementary manner so as to cause this radially outward flexing of the collar 48 when the sections 12 and 14 are snapped together. Nonetheless, those skilled in the art will readily appreciate that various other shapes and sizes of interconnecting structure may be employed by the stator section 12 and the rotor section 14 in order to achieve the desired snap fit connection.

Also, the tangs 56 occupy only a relatively small cross-sectional surface area of the annular space between the stator section 12 and the rotor section 14 adjacent to the collar 48. Thus, most of this annular space is open to allow fluid flow therethrough when purge fluid is supplied to the annular volume 36. This ability to maintain fluid flow between the stator section 12 and the rotor section 14 may be important in some circumstances, for example, in situations where the rotation of the rotor has stopped suddenly, but pressurized purge fluid continues to be supplied. In those instances, the purge fluid must be able to exit radially outwardly from the annular cartridge 10. Otherwise, the buildup of fluid pressure could cause damage to the bearing seal or perhaps even to the bearing itself. If the structure for providing the snap fit connection for the cartridge 10 were a completely encircling and interlocked structure, the outward flow of pressurized purge fluid would be impeded. Thus, although the invention contemplates a certain degree of variation in the size, shape and arcuate spacings of the tangs 56, it is desirable for the tangs 56 to be sized and shaped in a manner so that they occupy a relatively small portion of the circumferential annular space between the stator section 12 and the rotor section 14.

Figure 5:
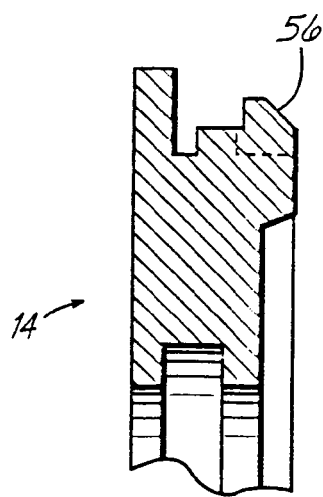
FIG. 5 is a cross-sectional view taken along 5—5 of FIG. 4.

FIG. 5 is a cross-sectional view taken along cross-sectional lines 5—5 of FIG. 4. FIG. 5 helps illustrate the shape of the rotor section 14, and particularly the shape of the rotor section 14 at the location of one of the tangs 56. Thus, FIG. 5 helps to show the relative ease with which the rotor section 14 of the present invention may be fabricated. This ease in fabrication of the rotor section 14, and also the ease in fabricating the stator section 12, plays an important role with respect to some of the advantages of this invention. More specifically, because it is relatively easy to machine these two primary sections which make up the cartridge 10, this invention facilitates the design and manufacture of an annular cartridge 10 in a size and a shape which may be dictated by the dimensions of any existing spindle. This versatility in shape, at relatively low cost, facilitates the retrofitting of existing spindles which have suffered a failed bearing seal. Essentially, the cartridge 10 of this invention can be readily and inexpensively adapted to accommodate a wide variety of spindle sizes and shapes.

Figure 6:
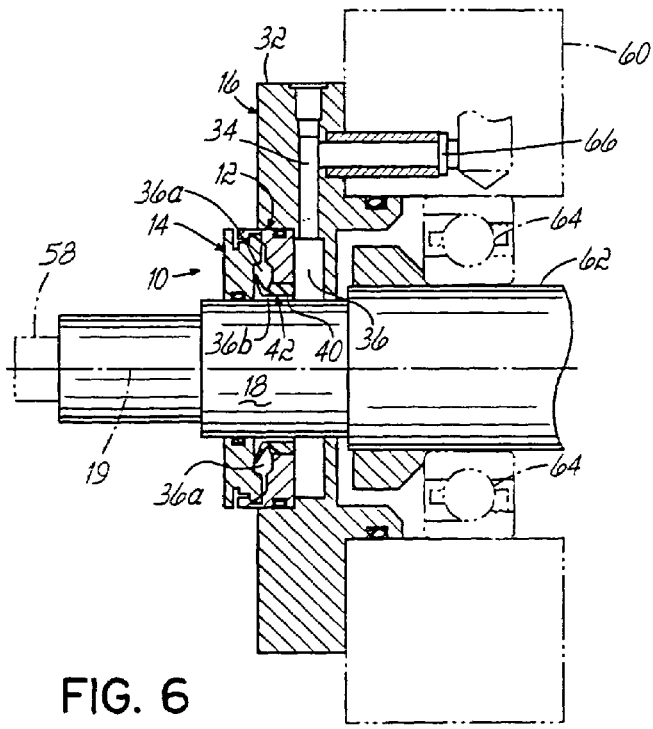
FIG. 6 is a partial cross-sectional view of a cartridge bearing seal instructed in accordance with another preferred embodiment of the invention, and mounted on a spindle.

FIG. 6 shows additional details of the annular cartridge type bearing seal 10 of the present invention, incorporated as part of a machine tool 58 mounted on the end of a rotor 18. The machine tool 58, along with rotor 18, rotates about an axis 19, while a spindle housing 60, the cap 32 and stator section 12 remain stationary. In essence, the spindle housing 16, the cap 32 and stator section 12 define the stator 16 of the machine tool, along with the other stationary components of the structure which support and house the rotatable shaft 62 on bearings 64, so that the shaft 62 rotates relative to the spindle housing 60. It should be understood that the shaft 62 can represent a spindle or any other motor-driven rotatable shaft employed in the machine tool industry.

Figure 7:
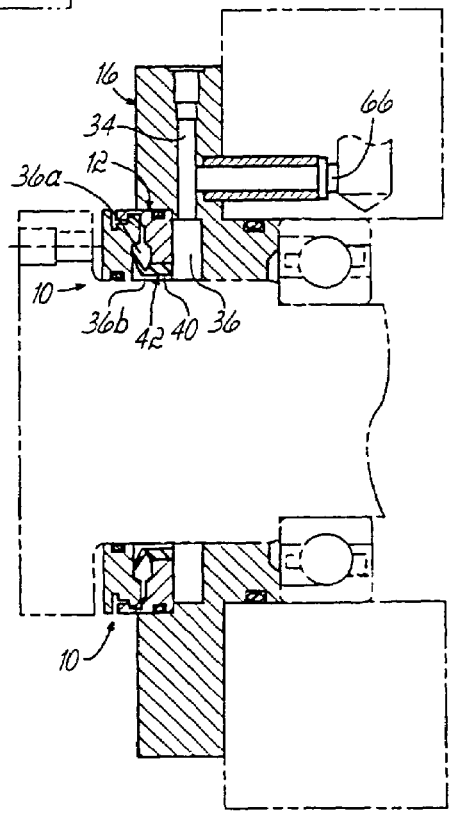
FIG. 7 is a partial cross-sectional view, similar to FIG. 6, showing a cartridge bearing seal constructed in accordance with yet another preferred embodiment of the invention, with the cartridge mounted on a spindle having a different shaft configuration.

FIGS. 6 and 7 show passageway 34 connected to annular volume 36. Moreover, FIG. 6 shows that passageway 34 is mounted so as to cooperate with a fluid pressure source 66, for supplying pressurized purge fluid into the spindle housing 60 via the passageway 34. The pressurized purge fluid flows into the annular volume 36, then to the left, as viewed in FIG. 6, and into the annular volume 36b which is bounded by the rotor 18 and the interior surface 40, then radially outwardly past the lip 44 of seal 42 into annular space 36a, then, through the arcuate space bounded by the collar 48, the rotor section 14 and the tangs 56, and then outwardly from the cartridge 10, as shown by directional arrows 54. It will be appreciated that, adjacent the collar 48 the flow passage for the purge fluid flowing outwardly from the cartridge 10 is ringlike, or annular in shape, except for the space occupied by the tangs 56. That is, the tangs 56 disrupt, or disconnect this shape, thereby to create three arcuate open sections of relatively equal size. These sections also rotate about axis 19 during rotation of the shaft 62, and to some extent the tangs 56 block the outward flow of purge fluid from the cartridge 10. Nonetheless, due to the rotation of the tangs 56, when the shaft 62 is rotating and due to the relatively small size of the tangs 56 compared to the open arcuate spaces between the tangs 56, the collar 48 and the tangs 56 do not significantly interrupt the uniform outward flow of purge fluid from the annular cartridge 10. More specifically, in operation the purge fluid flows outwardly from the annular cartridge 10 in a circumferentially uniform manner, with respect to both pressure and volume.

In one sense, the present invention modifies the prior invention of the above-cited patents, related to the supplying of circumferentially uniform purge fluid, by causing that purge fluid to flow outwardly through an annular space which is somewhat blocked by structure which partially impedes the outward flow of the purge fluid (namely the tangs 56). Nonetheless, because the tangs 56 rotate relative to the axis 19, they do not adversely affect the uniformity of the outward flow of purge fluid. At the same time, the tangs 56 do enable the sections 12 and 14 of the annular cartridge 10 to be easily snapped together, or pulled apart.

FIG. 7 shows a view similar to FIG. 6, but with a different size and shape cartridge 10, and a different shape for the rotor 18. With this Figure, the principles of the invention remain the same, as described above, and therefore applicant does not deem it necessary to renumber the components with different reference numerals or to further describe this structure in any additional detail. The primary purpose of FIG. 7 is to show the versatility of the annular cartridge 10 of the present invention, and particularly its ability to accommodate various types of spindles. In FIG. 7, the spindle is larger in shape and flanged. The flange includes bore holes which house set screws, for assisting in setting the axial location of the rotor section 14.

In use, to retrofit an existing spindle which has a failed bearing seal, an operator selects a cartridge 10 of desired shape. This means that the stator section 12 is sized to be fixedly mounted to the stator of the existing spindle 16, while the section 14 is sized to be mounted to the rotor 18. If absolutely necessary, in situations where the stator 16 and the rotor 18 are not a standard size, it would be possible to machine these structures to obtain a desired size and shape to which a stator section 12 and the rotor section 14 of known dimension may be mounted. Alternatively, the stator and rotor sections 12 and 14 can be made to a specific size that is needed. Prior to mounting the stator section 12, the end cap 32 is mounted to an end of the spindle housing 60. Depending on the circumstances, the end cap 32 and the stator section 12 may be supplied separately, or together, to facilitate and streamline the sizing of these components. Once the cap 32 has been mounted on the spindle housing, according to a preferred sequence of operation, the cartridge 10 is mounted to the cap 32. This occurs by press fitting the stator section 12 into the recess defined by the surfaces of the cap 32. In this manner, the rotor section 14 remains connected to the stator section 12, so that the cartridge 10 is attached to the cap 32 as a single unit. This connection of the cartridge 10 to the cap 32 may occur either before or after the cap 32 is mounted to the end of the spindle housing, depending upon the particular circumstances.

The rotor 18 is then moved in an axial direction, preferably toward the spindle housing, to press fit the rotor section 14 onto the rotor 18. To achieve a desired axially position the rotor section 14 relative to the stator section 12, shims (not shown) are temporarily located in the outer radial end of the fluid flow passage. The rotor 18 is slowly rotated relative to the spindle housing and the shims are successively inserted or removed in order to orient the rotor section 14 in a desired position relative to the stator section 12, and preferably in a manner which is circumferentially uniform about the spindle axis 19. In the desired position, via this process, the stator section 12 and the rotor section 14 will be axially spaced away from each other during operation so that there is no surface to surface contact during rotation of the rotor 18. Preferably, when the sections 12 and 14 of the cartridge 10 are connected via a snap fit, there is some amount of axial play, or axial tolerance. But when mounted, that play essentially becomes a clearance between the collar 48 and the rotor section 14. Applicant has learned that an axial play dimension of about 0.5 mm has proved suitable for most purposes, although this dimension may vary depending upon the circumstances. This feature can best be seen in FIG. 3. Because of this structure, the pressurized fluid flow from the stator section 12 to the rotor section 14 traverses arcuate spaces residing between the spaced tangs, and also around the radial outermost portions of the tangs 56.

A fluid pressure source 66 is operatively connected to the end cap 32, to supply pressurized purge fluid to the passageway 34 which is preferably oriented tangentially to the annular volume 36. This generates circumferentially uniform flow of purge fluid into the annular volume 36, and outwardly from the cartridge 10 via a fluid flow path which resides between the two interconnected section 12 and 14. This fluid flow path traverses the lip 44, which moves away from the rotor section 14 during rotation of the rotor 18 relative to the stator 16, when pressurized purge fluid is applied to the volume 36. After moving radially outwardly from the lip 44, the purge fluid moves through the space defined by the collar and the rotor section, specifically the tangs 56, and eventually beyond the outer surface 38 of the cartridge 10.

Applicant previously learned that the supplying of circumferentially uniform purge fluid to the annular volume surrounding a rotating shaft could be used to achieve significant advantages in preventing contaminant ingress into the bearing seals of a spindle. As details and embodiments of that prior invention are described and shown in the three U.S. patents described above, with this invention the applicant has achieved a practical way to apply the prior invention to virtually any spindle, via the use of an annular cartridge type bearing seal 10 formed by the stator section 12 and the rotor section 14 which easily snap together in a manner which permits relative rotation therebetween, about a common axis.

Thus, while embodiments of the invention has been described, it will be readily apparent to one of skill in the art that variations in these embodiments may be made without departing from the principles of the invention, the scope of which is defined by the appended claims.

We claim:

1. A bearing seal for preventing contaminant ingress between a rotatable shaft and a bearing housing which supports the shaft for rotation about an axis, comprising:
   an annular cartridge, the cartridge including first and second ringlike sections which are releasably connectable, the connected first and second sections having an inside surface and an outside surface and defining a fluid flow path which extends from the inside surface to the outside surface, the fluid flow path substantially encircling the shaft;
   a collar extending around the first section adjacent the outside surface; and
   a plurality of tangs extending radially from the second section, the tangs being arcuately spaced about the second section and sized to engage the collar when the sections are interconnected, the sections of the cartridge being relatively rotatable about a common axis when connected, the first section mounted to the bearing housing and the second section mounted to the shaft, whereby purge fluid supplied to an annular volume adjacent the inside surface traverses the flow path in a radially outward direction and eventually flows past the collar and the tangs and outwardly from the annular cartridge in a circumferentially uniform manner, thereby to prevent contaminant ingress.

2. A bearing seal for preventing contaminant ingress between a rotatable shaft and a bearing housing which supports the shaft for rotation about an axis, comprising:

an annular cartridge, the cartridge including first and second ringlike sections which are releasably connectable, the connected first and second sections having an inside surface and an outside surface and defining a fluid flow path which extends from the inside surface to the outside surface;

a collar extending around the first section adjacent the outside surface; and a plurality of tangs extending radially from the second section, the tangs being arcuately spaced about the second section and sized to engage the collar when the sections are interconnected, the sections of the cartridge being relatively rotatable about a common axis when connected, the first section mounted to the bearing housing and the second section mounted to the shaft, whereby purge fluid supplied to an annular volume adjacent the inside surface traverses the flow path in a radially outward direction and eventually flows past the collar and the tangs and outwardly from the annular cartridge in a circumferentially uniform manner, thereby to prevent contaminant ingress wherein one of the sections further comprises:

a circumferential lip which flexes away from the other of the sections to open the fluid flow path when the shaft is rotating relative to the bearing housing and the purge fluid is supplied to the annular volume.

3. The bearing seal of claim 1 wherein the collar further comprises:

an outer section which extends axially and an engagement section which extends radially inwardly from the outer section.

4. The bearing seal of claim 1 wherein the second section includes at least three tangs, the dimensions of the tangs being relatively small compared to the arcuately shaped spaces residing therebetween.

5. The bearing seal of claim 1 wherein the first section is sized to be mounted within a complementarily shaped recess of the bearing housing.

6. The bearing seal of claim 1 wherein the second section is sized to engage an external surface of the rotatable shaft.

7. The bearing seal of claim 1 and further comprising:

a cap assembly, the cap assembly including an internal passage for supplying pressurized purge fluid to the annular volume within the bearing housing which surrounds the rotatable shaft; and a fluid purge source mounted to the bearing housing adjacent the first section, and operatively connected to the internal passage.

8. The bearing seal of claim 2 wherein said one of the sections is the first section and said other of the sections is the second section.

9. The bearing seal of claim 4 wherein the tangs are substantially equidistantly spaced about the circumference of the second section.

10. A bearing seal for preventing contaminant ingress between a rotatable shaft and a bearing housing which supports the shaft for rotation about an axis, comprising:

means for supplying pressurized purge fluid into an annular volume surrounding the shaft in a manner so as to create a circumferentially uniform fluid pressure within the annular volume during rotation of the shaft relative to the bearing housing; and an annular cartridge including two interconnected ringlike sections, the annular cartridge including a first section mounted to the bearing housing and a second section mounted to the rotatable shaft, the cartridge defining a fluid flow path residing in communication with the annular volume such that pressurized purge fluid supplied to the annular volume flows radially outwardly between the two sections and away from the bearing housing in a circumferentially uniform manner, the fluid flow path substantially encircling the shaft and being annular in shape along its axial length, with no non-annular discontinuities along its axial length.

* * * * *

UNITED STATES PATENT AND TRADEMARK OFFICE
CERTIFICATE OF CORRECTION

PATENT NO. : 7,090,220 B2
APPLICATION NO. : 10/654811
DATED : August 15, 2006
INVENTOR(S) : Stephen C. Hoeting and Bobby L. Hodge It is certified that error appears in the above-identified patent and that said Letters Patent is hereby corrected as shown below:

Column 2
Line 43, reads "...the AIR SHIELD principle, to be ..." and should read --...the AIRSHIELD principle, to be ...--.

Column 3
Line 35, reads "...view of a cartridge bearing seal instructed in accordance ..." and should read --...view of a cartridge bearing seal constructed in accordance ...--.

Column 4
Line 23, reads "...first section 12 and second sections 14 are ..." and should read --...first section 12 and second section 14 are ...--.

Line 40, reads "As shown in the figures ..., that a flow path ..." and should read --As shown in the figures ..., a flow path ...--.

Column 6
Line 13, reads " ...lines 5 --5 of FIG. 4." and should read -- ...line5----5 of FIG. 4.--.

Column 7
Line 58, reads " ...a desired axially position the ..." and should read -- ... a desired axial position the ...--.

Column 8
Line 7, reads "Applicant has learned ..." and should read --Applicants have learned ...--.

Line 21, reads "...two interconnected section 12 and 14." and should read -- ...two interconnected sections 12 and 14.--.

Column 8
Line 30, reads "Applicant previously learned..." and should read --Applicants previously learned ...--.

UNITED STATES PATENT AND TRADEMARK OFFICE
CERTIFICATE OF CORRECTION

PATENT NO.       : 7,090,220 B2
APPLICATION NO.  : 10/654811
DATED            : August 15, 2006
INVENTOR(S)      : Stephen C. Hoeting and Bobby L. Hodge It is certified that error appears in the above-identified patent and that said Letters Patent is hereby corrected as shown below:

Column 8 (cont'd)
Line 43, reads "...while embodiments of the invention has been..." and should read --...while embodiments of the invention have been...--.

Signed and Sealed this

Nineteenth Day of December, 2006

JON W. DUDAS
*Director of the United States Patent and Trademark Office*